United States Patent [19]

Huber

[11] Patent Number: 4,848,155

[45] Date of Patent: Jul. 18, 1989

[54] TEST VALVE

[76] Inventor: Donald G. Huber, P.O. Box 64160, Tacoma, Wash. 98464

[21] Appl. No.: 167,884

[22] Filed: Mar. 14, 1988

[51] Int. Cl.[4] ............................................. G01M 3/04
[52] U.S. Cl. ....................................... 73/49.8; 4/199; 138/90
[58] Field of Search ...................... 73/49.8; 138/90, 89; 4/199

[56] References Cited

U.S. PATENT DOCUMENTS

| | | |
|---|---|---|
| 1,720,819 | 7/1929 | Cohen . |
| 1,948,220 | 2/1934 | Kennedy . |
| 3,392,409 | 7/1968 | Politz ...................................... 4/199 |
| 4,194,252 | 3/1980 | Tsuei ...................................... 4/199 |
| 4,203,473 | 5/1980 | Roberson, Sr. ................... 73/49.8 X |
| 4,429,568 | 2/1984 | Sullivan .............................. 73/49.8 |
| 4,460,019 | 7/1984 | Condon ................................ 138/90 |
| 4,542,642 | 9/1985 | Tagliarino ........................ 73/40.5 R |
| 4,602,504 | 7/1986 | Barber .................................. 73/49.8 |
| 4,658,861 | 4/1987 | Roberson .............................. 138/90 |
| 4,669,131 | 6/1987 | Barlow ............................... 4/199 X |

FOREIGN PATENT DOCUMENTS 313441 4/1956 Switzerland .......................... 138/89

Primary Examiner—Stewart J. Levy
Assistant Examiner—Joseph W. Roskos
Attorney, Agent, or Firm—Garrison and Stratton

[57] ABSTRACT

The present invention is a test valve plug assembly designed to be installed within a drain tee which connects a tub drainage and overflow system to the drainage system of a building. In its closed position, the test valve plug provides a means for closing the drain tee, thereby permitting the drainage system below the drain tee to be filled with water for testing purposes.

12 Claims, 5 Drawing Sheets

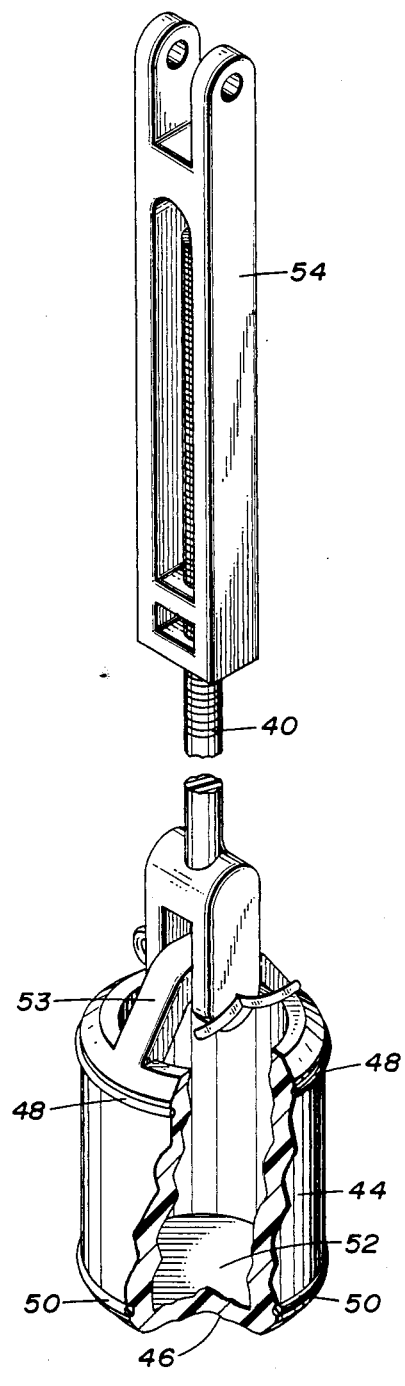
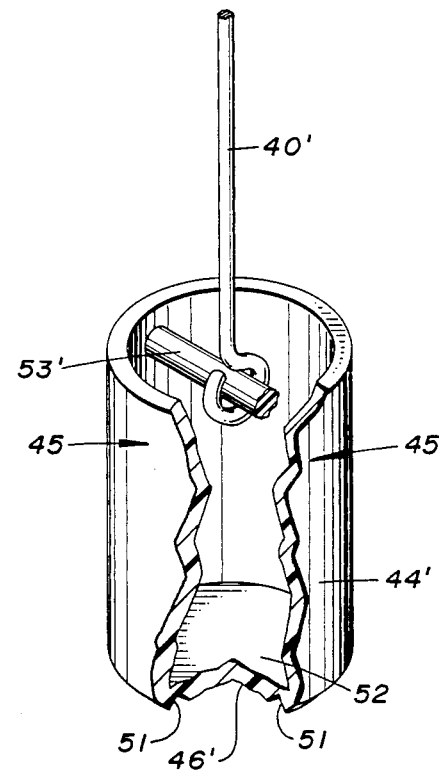
FIG. 4
FIG. 5

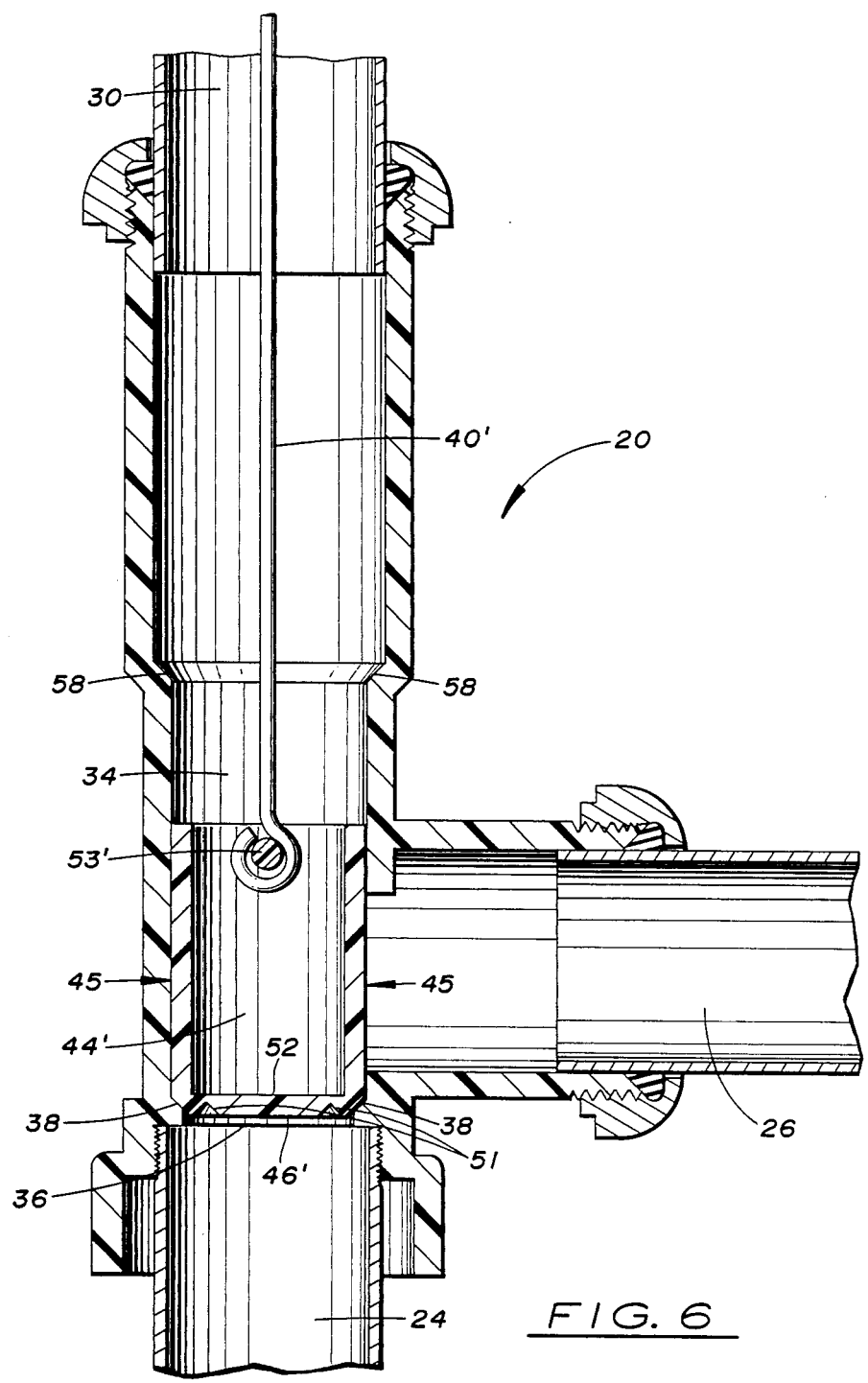

TEST VALVE

TECHNICAL FIELD

This invention relates to a test valve designed to be installed within the drain pipes of a building. More particularly, this invention relates to a test valve plug designed to temporarily replace the valve plug in a drain tee which connects a tub drain conduit and a tub overflow conduit to a drain pipe and the drainage system of a building. The test valve plug provides a means for closing the drain tee, thereby permitting the drain pipe and drainage system to be pressure tested for leaks.

BACKGROUND ART

Within the plumbing industry there has been a great need for various devices which aid in testing plumbing installations. It is general practice, and is often required by local building codes, to test new or repaired plumbing installations for leakage. This is particularly true for waste-water drainage systems. Testing is performed by closing access to a drain tee, filling the drain pipe and other portions of the drainage system to be tested with water under pressure, and inspecting the drainage system for leaks. Various testing methods and devices have been designed to close access to the drain tee.

The drain pipe may be capped and tested before the drain tee is attached thereto. The testing must occur prior to the installation of the tub drainage system.

Alternatively, a deflated, inflatable balloon or air bag may be inserted into the tub overflow conduit until the balloon is appropriately positioned within the drain tee. The balloon or air bag is then inflated to close the drain tee at the location of the balloon and prevent the escape of the test water into the tub. Such a device is difficult to use, particularly where the conduit has a small diameter. The device is also apt to improperly seal and leak under conditions where the balloon or air bag is required to resist elevated testing pressures. An erroneous test result may thus occur.

Other alternatives include the use of specially designed Y or T conduit test sections having various plug, gate, or inflatable bag assemblies. Sullivan, (U.S. Pat. No. 4,429,568), Cohen (U.S. Pat. No. 1,720,819), Tagliarino (U.S. Pat. No. 4,542,642), Roberson (U.S. Pat. No. 4,658,861), and Kennedy (U.S. Pat. No. 1,948,220) all disclose various closure devices. These types of closure structures are not only complicated, and accordingly expensive to manufacture, but they are also difficult to install.

DISCLOSURE OF INVENTION

It is the general object of the present invention to provide simplified test valve means having a test plug capable of being easily inserted into a tub drain conduit, such as found in a residential bathtub drainage system. Another general object is to provide a secure closing of the drain pipe or drain tee irrespective of the test pressure applied to the drain pipe or drainage system.

A further object is to provide a test valve plug which may be used after the tub and appropriate plumbing have been installed.

A still further object is to provide a test valve plug which is easily installed and removed without having to dismantle the plumbing installation or incorporate additional hardware, such as the devices disclosed in the above-referenced patents, into the drainage system.

Another object is to provide a test valve plug which may be made of only a few parts and may be inserted in place of a standard, lever-controlled, tub drain plug.

Another object is to provide a test valve plug which may be installed in place of the conventional tub drain plug and held in a closed position by its attachment to a standard trip lever, as commonly found in residential bathtubs.

Another object is to provide a test valve plug having a removable valve head which may be removed, after testing of the plumbing installation has been completed, thereby allowing the test valve plug to also function as a tub drain plug for normal operation of the tub drainage and overflow system without requiring the use of additional hardware.

The present invention is an apparatus which allows a drain tee to be closed or sealed for testing purposes. The apparatus comprises a test valve plug having a cylindrical wall and a valve head. The test valve plug is appropriately shaped and dimensioned to be able to pass into the interior portions of the drain tee and close or seal the fluid outlet of the drain tee. The fluid outlet of the drain tee communicates with a drainage system of the building.

The drain tee may have a tapered valve seat into which the tapered valve head of the test valve plug is urged. When located in a closed position, the valve head is held against the valve seat to close or seal the fluid outlet of the drain tee. The test valve plug may have a generally smooth outer wall which is appropriately dimensioned to fit within the drain tee with no or minimal clearance between the outer wall of the test valve plug and the interior wall of the drain tee. Alternatively, the test valve plug may be designed with at least one O-ring positioned in a groove in the cylindrical outer surface thereof. The O-ring provides a sealed engagement with the interior side walls of the drain tee. The O-ring further closes or seals the fluid outlet of the drain tee when the test valve plug is in a closed position. The engagement between the O-ring and the interior side walls of the drain tee imparts static frictional forces which tend to hold the test valve plug in a closed position during the testing procedures against pressure imposed downstream of the test valve plug.

A linkage means allows the installation, manipulation, and removal of the test valve plug within and from the drain tee. Linkage means may also have a handle to facilitate easier installation, manipulation, and removal of the test valve plug within the drain tee. Once the test valve plug is properly located in a closed position, the linkage means may be attached to a trip lever, which is commonly found in tub structures and their accompanying hardware. The trip lever assists to hold the linkage means such that the test valve plug remains in its closed position during the test procedure.

The valve head may also have a score line which defines a removable break-away seal. After the drainage system has been tested, the break-away seal may be removed so the test valve plug may function as a conventional tub drain plug, which permits overflow water to leave the tub through overflow and pass through the plug.

To practice the methods of this invention, the test valve plug is first inserted into the drain tee. The insertion of the test valve plug into the drain tee is continued until the test valve plug closes or seals the fluid outlet of the drain tee. The appropriate portions of the drainage system of the building are then filled with water, preferably at an elevated pressure, and the drainage system is inspected for leaks. Once the test is performed, the water is drained from the drainage system, and the test valve plug is removed from the drain tee.

BRIEF DESCRIPTION OF DRAWINGS

FIG. 4 is a partial perspective view of the preferred embodiment of the present invention with the test valve plug being broken away to show the valve head and O-rings.

FIG. 5 is a perspective view of an alternative embodiment of the test valve plug and linkage with a portion broken away to show the removable valve head.

FIG. 6 is an enlarged fragmentary sectional view of a tub drainage and overflow system similar to that shown in FIGS. 1, 2, and 3 with a test valve plug having a removable valve head in a closed position upon the valve seat within the drain tee.

BEST MODE FOR CARRYING OUT THE INVENTION

Figure 1:
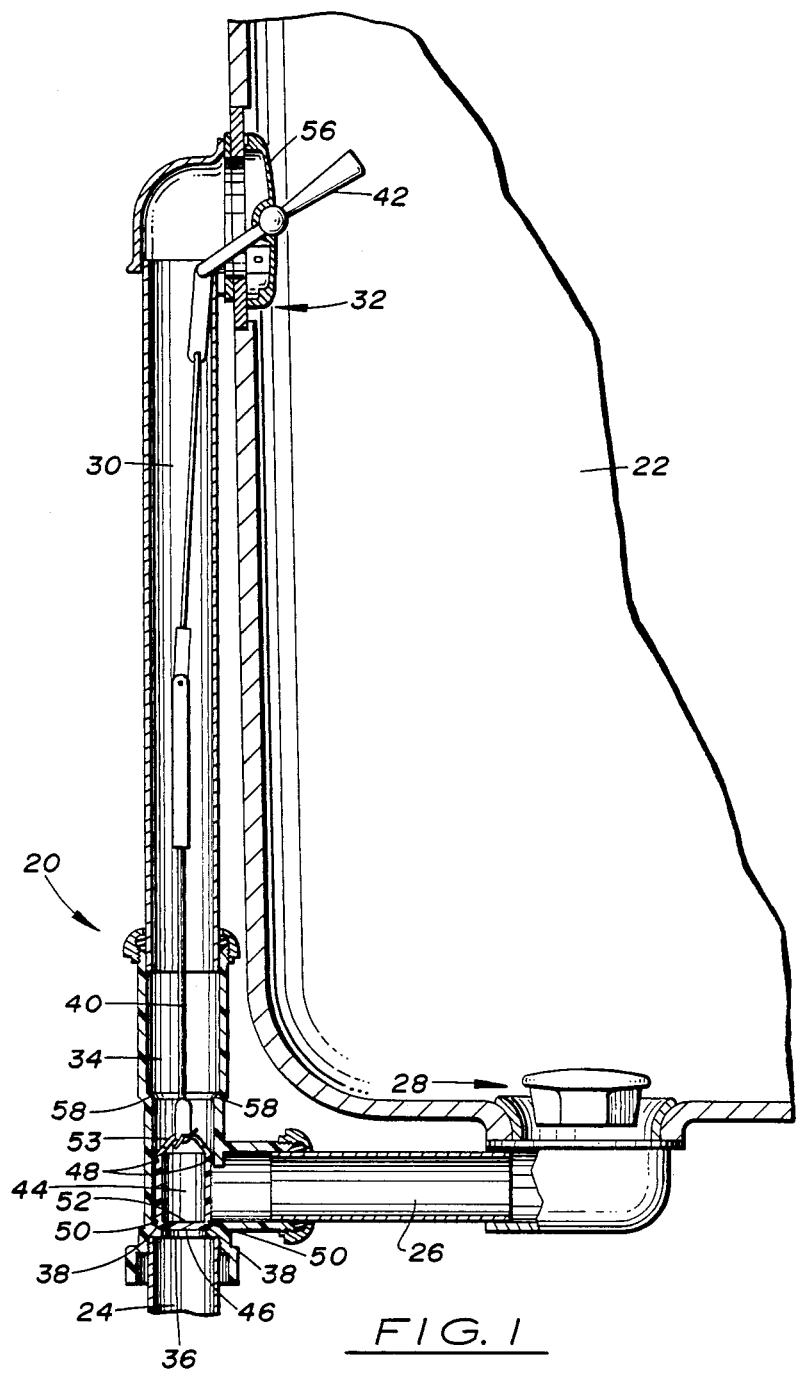
FIG. 1 is a partial side elevational view partly in section, of a bathtub and a tub drainage and overflow system showing a bistable trip lever mechanism and linkage means being connected to the test valve plug of the present invention.

Referring to the drawings and particularly to FIG. 1, wherein like numerals indicate like parts, tub drainage and overflow system 20 of somewhat conventional design is attached to tub 22 in such a manner that water may pass from tub 22 into drain pipe 24, which in turn is connected to the drainage or sewer drain system of the building. Tub drainage and overflow system 20 comprises a generally straight tub drain conduit 26 having a fluid drain inlet 28, a generally straight tub overflow conduit 30 having a fluid overflow inlet 32, and a drain tee 34. Drain tee 34 is a junction fitting connecting tub drain conduit 26, tub overflow conduit 30, and drain pipe 24. Drain tee 34 has a fluid outlet 36 where drain tee 34 is connected to drain pipe 24.

Figure 2:
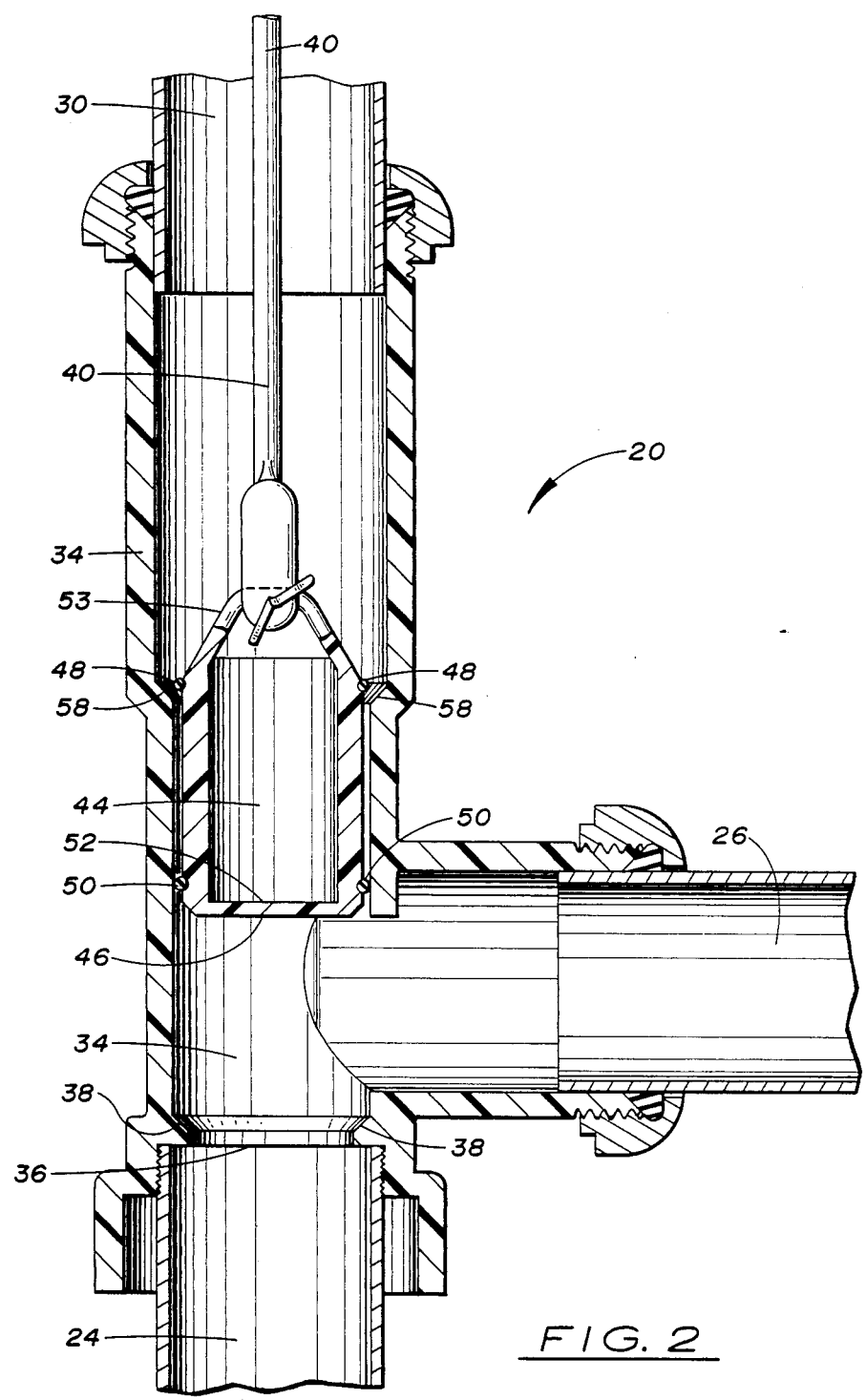
FIG. 2 is an enlarged fragmentary sectional view of the tub drainage and overflow system shown in FIG. 1 with the test valve plug positioned above a drain tee.

As shown in FIG. 2, a valve seat 38 is positioned within drain tee 34 above drain pipe 24 but below the intersection of tub drain conduit 26 and tub overflow conduit 30. Valve seat 38 is formed or embossed in drain tee 34. Valve seat 38 tapers to a smaller diameter than the interior diameter of tub overflow conduit 30 or of the interior portions of drain tee 34 located above valve seat 38.

During normal operation, tub drainage and overflow system 20 functions as a part of the drainage system of the building. Tub 22 may contain water when fluid drain inlet 28 is blocked or closed. This usually occurs with the use of a hollow bucket, drop valve, or tub drain plug which is attached to linkage means 36 and a trip lever 42. The tub drain plug is positioned within drain tee 34 to rest upon valve seat 38. Thus positioned, the tub drain plug closes fluid drain inlet 28 to prevent water from leaving tub 22. The tub drain plug is designed to be hollow so it will not block or close fluid overflow conduit 30. This allows water to escape through fluid overflow inlet 32 and travel down tub overflow conduit 30 to drain pipe 24 if the water level in tub 22 reaches fluid overflow inlet 32.

Test valve plug 44 is similar to the above-described tub drain plug, but it is not open for flow of water therethrough. Rather, test valve plug 44 comprises a specially designed floored bucket, drop valve, or shut-off valve body which has a valve head 46. When properly installed in its closed position, test valve plug 44 prevents water, even at elevated pressures, from traveling through tub drain conduit 26 and/or tub overflow conduit 30 into or from drain pipe 24. Test valve plug 44 is appropriately shaped and dimensioned to easily pass into and down tub overflow conduit 30 and seal fluid outlet 36. As shown in FIGS. 5 and 6, an alternate embodiment uses test valve plug 44′ with a smooth outer side wall 45. Test valve plug 44′ may be appropriately dimensioned to minimize the clearance, while in the closed position, between side wall 45 and the interior side wall of drain tee 34.

Figure 3:
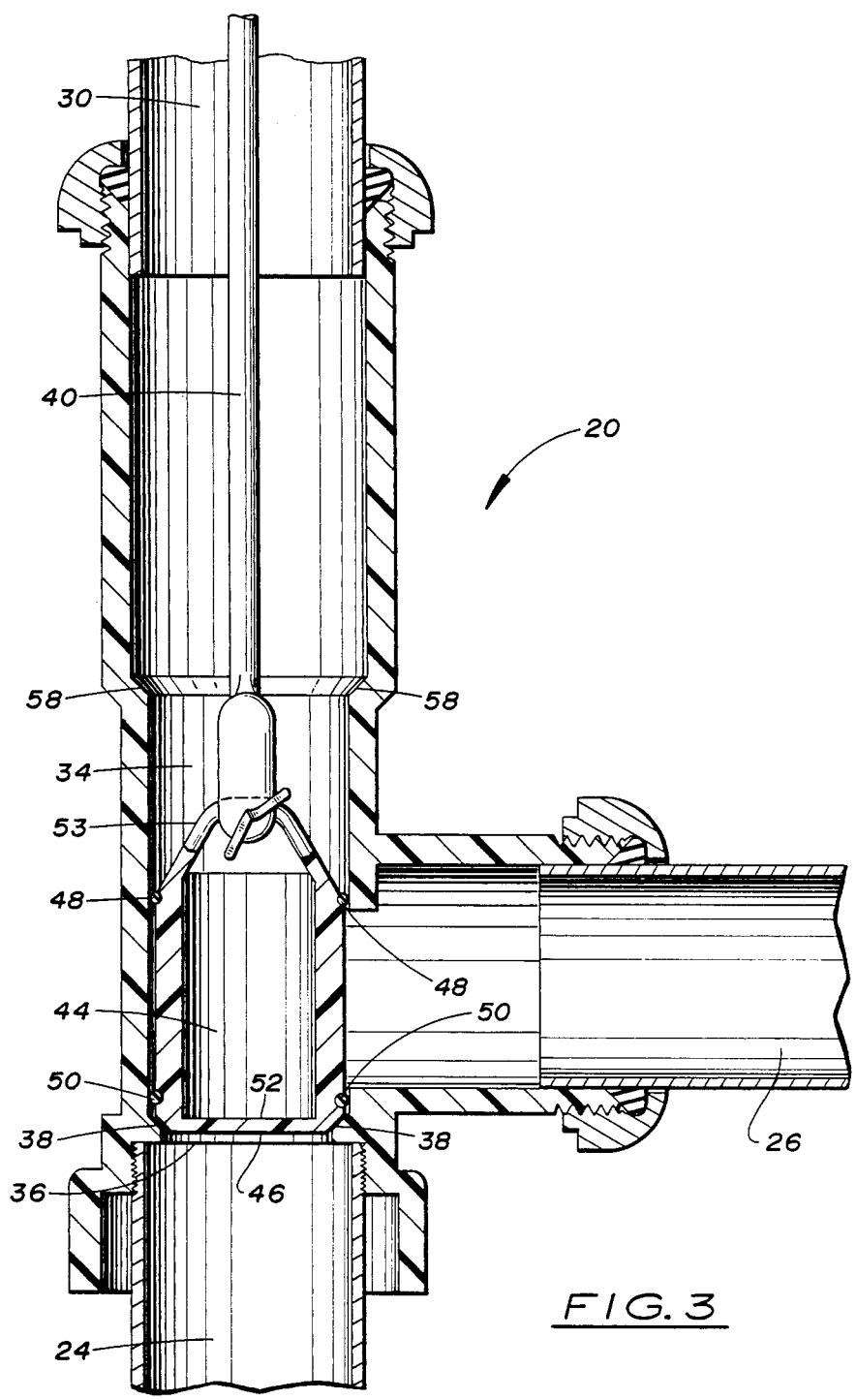
FIG. 3 is an enlarged fragmentary sectional view of the tub drainage and overflow system shown in FIGS. 1 and 2 with the test valve plug being located in a closed position upon a valve seat within the drain tee.

As shown in FIGS. 2 and 3, which indicate the preferred embodiment, appropriately dimensioned O-rings 48 and 50 are positioned in grooves formed or cut into the surface of the outer side wall of test valve plug 44. O-rings 48 and 50 form a water tight engagement with the interior side wall of drain tee 34, sealing fluid outlet 36 and providing static frictional forces between the interior wall of drain tee 34 and the outer wall of test valve plug 44, thereby resisting the displacing forces of the pressurized testing water. In the preferred embodiment, O-ring 50 is slightly larger than O-ring 48. This configuration aids in sealing fluid outlet 36, but does not impart such a high frictional force as to make installation or removal of test valve plug 44 difficult.

As shown in FIGS. 5 and 6, test valve plug 44′ is provided with an indentation or score line 51 whereby floor 52 of valve head 46′ may be removed. Floor 52 comprises a removable wall or membrane which may be torn out or knocked out of test valve plug 44′. This allows test valve plug 44′ to have a liquid flow path through the hollow interior thereof for free flow of the water entering overflow conduit 30 after the pressure test is completed. Test valve plug 44′ may then be used as a tub drain plug eliminating the need to purchase additional hardware.

As shown in FIGS. 1-4, test valve plug 44 is provided with attachment means for connection to linkage means 40. Linkage means 40 allows the user to exert a force against test valve plug 44 deep within drain tee 34 to urge test valve plug 44 into a closed position against valve seat 38. Linkage means 40 also allows the user to withdraw test valve plug 44 from tub drainage and overflow system 20 after the test has been performed. Linkage means 40 may be provided with handle 54, as shown in FIG. 4, to assist the user in manipulating linkage means 40 to adjust the position of test valve plug 44 within drain tee 34. Linkage means 40 may incorporate the linkage elements used to control the tub drain plug, or linkage means 40 may be a separate device which is used only with test valve plug 44 for testing purposes. Alternative attachment means 53′ and alternative linkage means 40′ are shown in FIGS. 5-6.

After installation of tub 22 and tub drainage and overflow system 20, cover plate 56, trip lever 42, linkage means 40, and the tub drain plug are removed to facilitate testing of drain pipe 24 and the drainage system of the building. The tub drain plug is removed from linkage means 40. Test valve plug 44 is attached to linkage means 40 by attachment means 53. Length may be added to linkage means 40 to enable proper manipulation of linkage means 40. Test valve plug 44 is then inserted into tub overflow conduit 30 through fluid overflow inlet 32. By manipulating linkage means 40, test valve plug 44 is moved axially down tub overflow conduit 30 into drain tee 34. Test valve plug 44 may be guided into proper alignment with valve seat 38 by its engagement with valve guide 58 which is located on the inside wall of drain tee 34. Linkage means 40 is further manipulated until test valve plug 44 has achieved its proper closed position against valve seat 38, thereby closing drain tee 34. When in its proper closed position, tapered valve head 46 forms a tight, wedged fit against tapered valve seat 38.

If test valve plug 44 should become stuck by the presence of mud or other foreign substances located within tub overflow conduit 30 or drain tee 34, it is possible to properly seat valve head 46 against and into valve seat 38 by employing an axial blow against the upper end of linkage means 40 to force test valve plug 44 into its closed position.

Linkage means 40 may be secured to tub 22 by attaching linkage means 40 to trip lever 42. Trip lever 42 is then secured to tub 22. This enables the user to leave tub 22, fill drain pipe 24 and the appropriate portions of the drainage system of the building with water under pressure, and check the installation for leaks. Alternatively, linkage means 40 may be held in position by some other holding means during the testing procedure.

Following conventional practices, water is then admitted into drain pipe 24 and the appropriate portions of the drainage system of the building. An elevated hydraulic pressure may also be applied to the drainage system. An inspection for leaks is conducted.

When the test has been completed, linkage means 40 is disconnected from its holding means. Test valve plug 44 is removed from drain tee 34 and tub overflow conduit 30 by means of pulling on linkage means 40. Once test valve plug 44 has been removed from tub drainage and overflow system 20, test valve plug 44 may be removed from linkage means 40 at attachment means 53. The tub drain plug may then be attached to linkage means 40 and be installed within tub drainage and overflow system 20.

Alternatively, valve head 46' may be incorporated into test valve plug 44 or 44'. After the test has been completed, test valve plug 44 or 44' is removed from drain tee 34 and tub overflow conduit 30. Floor 52 may then be knocked out or removed, thereby turning test valve plug 44 or 44' into a conventional tub drain plug. Where floor 52 and valve head 46' are incorporated into test valve plug 44, O-ring 50 may need to be replaced with a smaller O-ring to reduce the static and sliding frictional forces which would otherwise occur between the interior wall of drain tee 34 and O-ring 50.

This invention discloses a test valve plug structure which can be quickly and securely mounted in place without the necessity of using expensive, complicated, and cumbersome additional devices such as air compressors, balloons, or air bags.

In compliance with the statute, the invention has been described in language more or less specific as to structural features. It is to be understood, however, that the invention is not limited to the specific features shown, since the means and construction herein disclosed comprise the preferred form of putting the invention into effect. The invention is claimed in any of its forms or modifications within the legitimate and valid scope of the appended claims, appropriately interpreted in accordance with the doctrine of equivalents.

INDUSTRIAL APPLICABILITY

This invention is particularly adapted for closing a drain tee of a tub drainage and overflow system so that the drainage system of the building below the drain tee may be filled with water for testing purposes.

I claim:

1. An apparatus for sealing a fluid outlet of a drain tee to prevent flow from tub drain and tub overflow conduits during the pressure testing of a tub drainage system, comprising a test valve plug having a hollow cylindrical body defining an interior passage and a valve head, said valve head closing the interior passage preventing flow of water therethrough from said overflow conduit, said test valve plug being appropriately shaped and dimensioned to pass into the interior of said drain tee to close or seal said fluid outlet.

2. The apparatus of claim 1 wherein said drain tee has a tapered valve seat, said cylindrical body and valve head being correspondingly tapered to fit into said valve seat.

3. The apparatus of claim 1 wherein said valve head has a score line defining a removable break-away seal, whereby upon removal thereof, water from said overflow is permitted to flow therethrough in normal service operation.

4. The apparatus of claim 1 wherein said test valve plug has a generally smooth outer wall.

5. The apparatus of claim 1 wherein said test valve plug has at least one appropriately dimensioned O-ring positioned in a groove formed in said wall.

6. The apparatus of claim 1 further comprising an attachment means connected to said test valve plug.

7. The apparatus of claim 6 further comprising a linkage means, said linkage means being attached to said test valve plug by said attachment means, said linkage means allowing the installation, manipulation, and removal of said test valve plug within said drain tee.

8. The apparatus of claim 7 wherein said linkage means has a handle for easy installation, manipulation, and removal of said test valve plug within said drain tee.

9. The apparatus of claim 7 further comprising a trip lever, said linkage means being attached to said trip lever during the testing of said drainage system.

10. A method testing a tub drainage system comprising the steps of:
   (a) inserting a test valve plug having a cylindrical body and a valve head closing one end thereof into a drain tee, said drain tee having a fluid outlet communicating with a waste water system and fluid inlets communicating with a tub drain conduit and a tub overflow conduit, said test valve plug being appropriately shaped and dimensioned to pass into the interior of said drain tee to close or seal said fluid outlet preventing flow from either of said inlets;
   (b) closing said fluid outlet with said test valve plug;
   (c) filling said tub drain conduit and said tub overflow conduit with water;
   (d) inspecting said tub drain conduit and said tube overflow conduit for leaks; and
   (e) removing said test valve plug from said drain tee.

11. The method of claim 10 further comprising the step of pressurizing said water filled conduits to enhance the observation of leaks.

12. A method of testing a tub drainage system comprising the steps of:

(a) inserting a test valve plug having a cylindrical body and a valve head closing one end thereof into a drain tee, said drain tee having a fluid outlet communicating with a waste water system and fluid inlets communicating with a tub drain conduit and a tub overflow conduit, said test valve plug being appropriately shaped and dimensioned to pass into the interior of said drain tee to close or seal said fluid outlet preventing flow from either of said inlets;

(b) closing said fluid outlet with said test valve plug;

(c) filling said tub drain conduit and said tub overflow conduit with water;

(d) inspecting said tub drain conduit and said tub overflow conduit for leaks;

(e) removing said test valve plug from said drain tee;

(f) removing at least a portion of said valve head from said test valve plug to form a drain plug; and (g) reinserting said drain plug into said drain tee to form an operational drain valve assembly for selectively controlling water flow into said drainage system while permitting flow of overflow water through said drain plug.

* * * * *